(12) United States Patent
Henry et al.

(10) Patent No.: US 8,844,269 B2
(45) Date of Patent: Sep. 30, 2014

(54) AFTERTREATMENT SYSTEM AND METHOD FOR PRE-DECOMPOSED REDUCTANT SOLUTION

(75) Inventors: Cary Henry, Columbus, IN (US);
Aleksey Yezerets, Columbus, IN (US);
Neal Currier, Columbus, IN (US);
Krishna Kamasamudram, Columbus, IN (US); Andrew Osburn, Nashville, IN (US)

(73) Assignee: Cummins Inc., Columbus, IN (US)

( * ) Notice: Subject to any disclaimer, the term of this patent is extended or adjusted under 35 U.S.C. 154(b) by 189 days.

(21) Appl. No.: 13/421,918

(22) Filed: Mar. 16, 2012

(65) Prior Publication Data

US 2013/0239549 A1 Sep. 19, 2013

(51) Int. Cl.
*F01N 3/00* (2006.01)

(52) U.S. Cl.
USPC .......... 60/286; 60/274; 60/295; 60/301; 60/303

(58) Field of Classification Search
USPC .......... 60/274, 278, 286, 295, 297, 298, 301, 60/303
See application file for complete search history.

(56) References Cited

U.S. PATENT DOCUMENTS

| | | | |
|---|---|---|---|
| 5,884,475 A * | 3/1999 | Hofmann et al. ............... | 60/274 |
| 6,093,380 A | 7/2000 | Lagana et al. | |
| 6,616,901 B1 | 9/2003 | Lagana et al. | |
| 7,207,323 B1 * | 4/2007 | Hemsath ................... | 123/568.11 |
| 7,954,311 B2 * | 6/2011 | Shaikh et al. .................. | 60/266 |
| 8,088,201 B2 * | 1/2012 | Johannessen ................... | 96/108 |
| 8,240,277 B1 * | 8/2012 | Michikawauchi et al. ... | 123/1 A |
| 8,418,443 B2 * | 4/2013 | Millet et al. .................... | 60/286 |
| 2004/0118106 A1 * | 6/2004 | Liang et al. .................... | 60/278 |
| 2005/0000497 A1 | 1/2005 | Nakai et al. | |
| 2007/0119153 A1 | 5/2007 | Pierz et al. | |
| 2008/0267837 A1 | 10/2008 | Phelps et al. | |
| 2010/0015029 A1 | 1/2010 | Phelps, Sr. et al. | |
| 2010/0275581 A1 | 11/2010 | Wada et al. | |
| 2012/0045378 A1 | 2/2012 | Soukhojak et al. | |

OTHER PUBLICATIONS

Sullivan, et ai, "A Combination of NOx Trapping Materials and Urea-SCR Catalysts for Use in the Removal of NOx from Mobile Diesel Engines", Applied Catalysis B: Environmental, 70 (1-4): 205-214, Jan. 2007. Also available at http://irserver.ucd.ie/bitstream/handle/10197/3991/repository.pdf?sequence=4.
International Search Report and Written Opinion, PCT/US2013/029241, Cummins Inc,, US/The International Searching Authority, Apr. 30, 2013, 12 pgs.

* cited by examiner

*Primary Examiner* — Binh Q Tran
(74) *Attorney, Agent, or Firm* — Krieg DeVault LLP (57) ABSTRACT

There is disclosed a method and system for pressurizing a reductant solution from a reductant storage device and superheating the pressurized reductant solution. The superheated pressurized reductant solution at least partially decomposes in the heat exchanger and/or a decomposition chamber before it is released into an exhaust system. The at least partially decomposed reductant solution is delivered to the exhaust system upstream of the SCR catalyst.

36 Claims, 3 Drawing Sheets

AFTERTREATMENT SYSTEM AND METHOD FOR PRE-DECOMPOSED REDUCTANT SOLUTION

FIELD OF THE INVENTION

The present invention relates in general to internal combustion engine technology and nitrous oxide ($NO_x$) emission reduction by selective catalytic reduction (SCR). More particularly, the present invention relates to the treatment of a reductant solution as part of an aftertreatment system for a diesel engine.

BACKGROUND

Some current aftertreatment technologies utilize an SCR catalyst and injection of a reduction agent into the exhaust stream upstream of the SCR catalyst. On the catalyst, the $NO_x$ in the exhaust stream is reduced to $N_2$ (nitrogen) and $H_2O$ (water). One common type of reduction agent is anhydrous ammonia ($NH_3$), provided in a urea solution. When mixing with the exhaust gas beyond a certain temperature, the water portion of the urea solution is vaporized and the urea decomposes to form $NH_3$ and carbon dioxide ($CO_2$). The $NH_3$ reacts with NO and $NO_2$ over the SCR catalyst to form $N_2$ and $H_2O$.

The current methods of dosing urea solution into the exhaust gas under certain conditions can result in impingement of urea solution droplets on the walls of the exhaust tubing. While bulk exhaust gas temperatures are theoretically sufficiently high to decompose the urea solution to gaseous $NH_3$, the impingement of droplets of urea solution results in localized cooling on the walls of the exhaust tubing. Where this localized cooling exists, the urea solution does not fully decompose which results in solid deposit build-up that causes restrictions in the exhaust gas flow, and reduction in $NO_x$ conversion over the SCR catalyst due to insufficient supply of $NH_3$. Current strategies to mitigate this problem include avoiding injection of urea solution into the exhaust system until the exhaust gas temperature is sufficiently high to decompose the urea solution, and relying on manipulation of exhaust control strategies to increase exhaust temperature to remove solid urea deposits. However, this can result in additional $NO_x$ emissions, particularly during cold start and low duty cycle conditions, in addition to negatively impacting fuel economy. Even systems that currently preheat the urea solution prior to injection may have limited applicability in cold start and low duty cycle conditions due to the potential that in certain conditions exhaust gas temperatures are not sufficient to decompose the urea solution and prevent condensation or droplet formation on the walls of the exhaust tubing. Therefore, further improvements in this area of technology are needed.

SUMMARY

Systems and methods for pressurizing and superheating a reductant solution and at least partially decomposing the reductant solution before release into an exhaust system for enhancing internal combustion engine aftertreatment operation are disclosed. Further embodiments, forms, objects, features, advantages, aspects, and benefits shall become apparent from the following description and drawings.

DETAILED DESCRIPTION OF THE ILLUSTRATED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, and any alterations and further modifications in the illustrated embodiments, and any further applications of the principles of the invention as illustrated therein as would normally occur to one skilled in the art to which the invention relates are contemplated herein.

Figure 1:
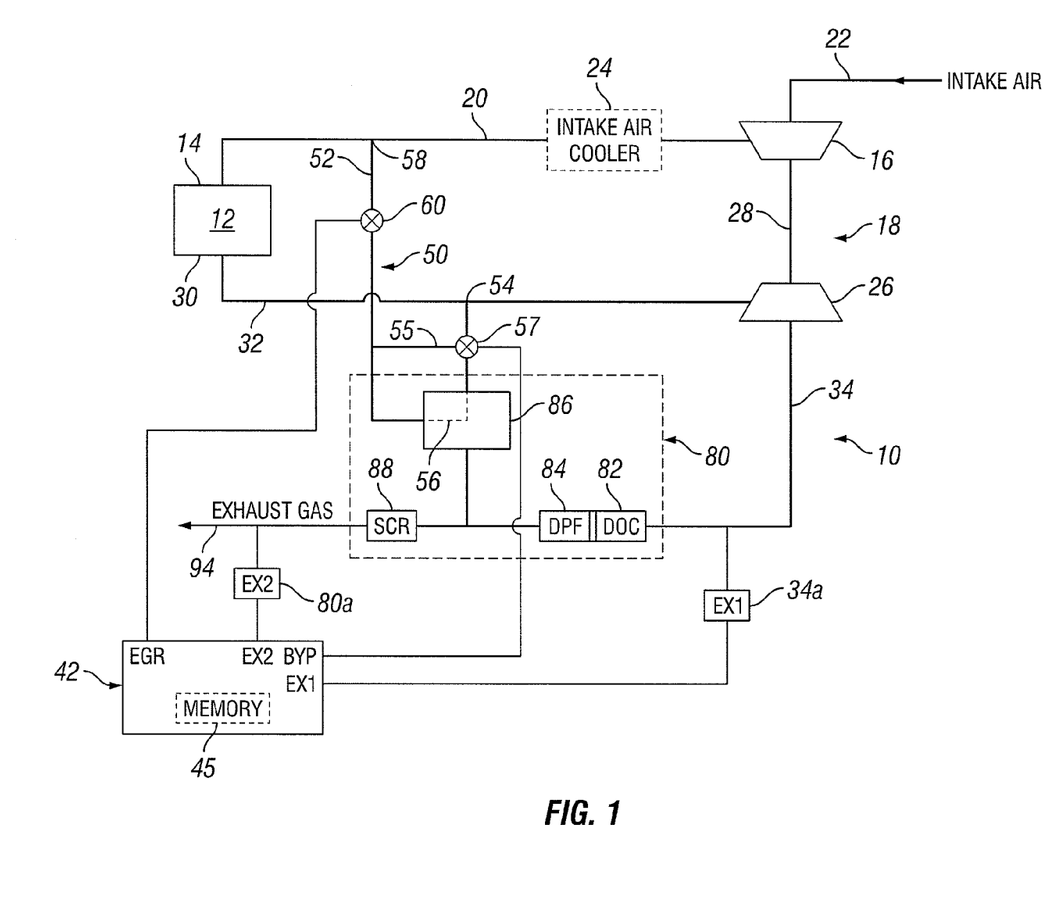
FIG. 1 is a schematic illustration of an internal combustion engine system including an aftertreatment system according to one embodiment of the present invention.

FIG. 1 shows an internal combustion engine system 10 of one embodiment of the present invention. System 10 includes an internal combustion engine 12 having an intake manifold 14 fluidly coupled to an outlet of a compressor 16 of a turbocharger 18 via an intake conduit 20. Compressor 16 includes a compressor inlet fluidly coupled to an intake conduit 22 for receiving fresh air therefrom. System 10 may also include an intake throttle (not shown) and/or an intake cooler 24 of known construction disposed in line with intake conduit 20 between compressor 16 and intake manifold 14. The turbocharger compressor 16 is mechanically coupled to a turbocharger turbine 26 via a drive shaft 28. Turbine 26 includes a turbine inlet fluidly coupled to an exhaust manifold 30 of engine 12 via an exhaust conduit 32. Collectively, intake conduit 20, intake manifold 14, engine 12, exhaust manifold 30, and exhaust conduit 32 define a pathway along which gas flows from compressor 16 to turbine 26 during nominal operation of engine 12. Engine 12 can be of any type, and is a diesel engine in one particular embodiment.

System 10 also includes aftertreatment system 80 to provide for aftertreatment of exhaust gases before discharge through a conduit 94, such as a tailpipe. During engine operation, exhaust gas flows from an outlet of turbine 26 through an exhaust conduit 34 in fluid communication therewith. Conduit 34 is also in fluid communication with aftertreatment system 80, which receives the exhaust gas from turbine 26 for aftertreatment. Aftertreatment system 80 can include a number of devices to chemically convert and/or remove undesirable constituents from the exhaust stream before discharge into the environment.

In one specific embodiment, exhaust aftertreatment system 80 may include an oxidation catalyst (DOC) 82 which is in fluid communication with exhaust flow path 34 and is operable to catalyze oxidation of one or more compounds in exhaust flowing through exhaust flow path 34, for example, oxidation of unburned hydrocarbons, carbon monoxide, or oxidation of NO to $NO_2$. In another embodiment, exhaust aftertreatment system 80 may further include a diesel particulate filter (DPF) 84 in fluid communication with exhaust flow path 34 and operable to reduce the level of particulates in exhaust flowing through exhaust flow path 34. In an exemplary embodiment diesel particulate filter 84 is a catalyzed soot filter. Other embodiments utilize other types of diesel particulate filters.

Exhaust aftertreatment system 80 may include a reductant injection subsystem 86 and an SCR catalyst 88. As discussed further below, reductant injection subsystem 86 is supplied with reductant from a reductant reservoir or storage device and is operable to release reductant into exhaust flow path 34.

In an exemplary embodiment the reductant is an aqueous solution of urea which decomposes to provide ammonia. Other embodiments utilize different reductants, for example, aqueous solutions of ammonia, anhydrous ammonia, or other reductants suitable for SCR operation. Reductant injected into exhaust flow path 34 is provided to SCR catalyst 88 which is in flow communication with exhaust flow path 34 and is operable to catalyze the reduction of $NO_x$. The SCR catalyst 88 can be of any type of SCR catalyst known in the art. Exhaust aftertreatment system 80 may further include a hydrocarbon (HC) injector (not shown) which is supplied with HC from an HC reservoir (not shown) and is operationally coupled to the exhaust stream at a position upstream of SCR catalyst 88. Other embodiments contemplate HC injector is omitted and hydrocarbons are added by the fuel system or any other suitable means known in the art.

Exhaust flow path 34, as illustrated schematically in FIG. 1, may be provided in a variety of physical configurations and the order of the aftertreatment components could be changed. For example, the DPF 84 could be provided downstream from SCR catalyst 88. In an exemplary embodiment an exhaust flow path proceeds from the output of a turbocharger of an engine through a conduit to a structure containing an oxidation catalyst and a diesel particulate filter, through a second conduit to a structure containing an SCR catalyst and through another conduit which outlets to the ambient environment. This embodiment may also include an ammonia oxidation AMOX catalyst (not shown) at a position downstream of the SCR catalyst, which is operable to catalyze the reaction of $NH_3$ which slips past the SCR catalyst.

Engine 12 further includes an exhaust gas recirculation (EGR) subsystem 50 that recirculates exhaust gas from, for example, exhaust conduit 32 to intake conduit 20. EGR subsystem 50 includes an EGR conduit 52 having an inlet 54 connected to exhaust conduit 32 near exhaust manifold 30 and an outlet 58 connected to intake conduit 20. An EGR valve 60 may be provided to control flow through EGR conduit 52. EGR subsystem 50 further includes a reductant heating portion 56 associated with reductant injection system 86. A reductant heating portion bypass valve 57 may be provided so the exhaust gas can be recirculated through bypass conduit 55 and bypass reductant injection system 86. As discussed further below, the techniques and systems described herein allow for superheating and at least partial pre-decomposition of reductant solution during operation of engine 10 in a manner that increases the efficiency of aftertreatment system 80 during cold start, low load, low temperature, and/or any other condition or conditions where reduced thermal energy requirements from the exhaust gas is desired. The techniques and systems discussed herein further provide for superheating of the reductant solution using exhaust gas recirculation and thus make use of waste heat to improve system efficiency.

System 10 includes a controller 42 that is generally operable to control and manage operational aspects of engine 12. Controller 42 includes memory 45 as well as a number of inputs and outputs for interfacing with various sensors and systems coupled to engine 12 and aftertreatment system 80. Controller 42 can be an electronic circuit comprised of one or more components, including digital circuitry, analog circuitry, or both. Controller 42 may be a software and/or firmware programmable type; a hardwired, dedicated state machine; or a combination of these. In one embodiment, controller 42 is of a programmable microcontroller solid-state integrated circuit type that includes memory 45 and one or more central processing units. Memory 45 can be comprised of one or more components and can be of any volatile or nonvolatile type, including the solid-state variety, the optical media variety, the magnetic variety, a combination of these, or such different arrangement as would occur to those skilled in the art. Controller 42 can include signal conditioners, signal format converters (such as analog-to-digital and digital-to-analog converters), limiters, clamps, filters, and the like as needed to perform various control and regulation operations described herein. Controller 42, in one embodiment, may be a standard type sometimes referred to as an electronic or engine control module (ECM), electronic or engine control unit (ECU) or the like, that is directed to the regulation and control of overall engine operation. Alternatively, controller 42 may be dedicated to control of just the operations described herein or to a subset of controlled aspects of engine 12. In any case, controller 42 preferably includes one or more control algorithms defined by operating logic in the form of software instructions, hardware instructions, dedicated hardware, or the like. These algorithms will be described in greater detail hereinafter, for controlling operation of various aspects of system 10.

Controller 42 includes a number of inputs for receiving signals from various sensors or sensing systems associated with elements of system 10. While various sensor and sensor inputs are discussed herein, it should be understood that other sensor and sensor inputs are possible. Furthermore, one or more sensors and sensor inputs discussed herein may not be required. The operative interconnections of controller 42 and elements of system 10 may be implemented in a variety of forms, for example, through input/output interfaces coupled via wiring harnesses, a datalink, a hardwire or wireless network and/or a lookup from a memory location. In other instances all or a portion of the operative interconnection between controller 42 and an element of system 10 may be virtual. For example, a virtual input indicative of an operating parameter may be provided by a model implemented by controller 42 or by another controller which models an operating parameter based upon other information.

System 10 may include various sensors electrically connected to corresponding input of controller 42 via a corresponding signal path to provide a signal corresponding to an operating condition or parameter of engine 12, EGR subsystem 50, and aftertreatment system 80. For example, sensors (not shown) can be provided to indicate engine speed, engine position, intake manifold temperature, intake manifold pressure, exhaust manifold pressure, throttle position, turbocharger wastegate valve control, EGR valve control, and/or fuel command control.

In the illustrated embodiment, controller 42 includes a number of inputs for receiving signals from various exhaust temperature sensors associated with system 10. For example, system 10 includes an exhaust temperature sensor 34a disposed in fluid communication with exhaust conduit 34 and connected to a temperature input Ex1. Exhaust temperature sensor 34a is operable to sense the temperature of the exhaust as it enters aftertreatment system 80. System 10 further includes an exhaust temperature sensor 80a which provides controller 42 with information indicative of the temperature of the exhaust flowing out of aftertreatment system 80, and electrically connected to temperature input Ex2 of controller 42. Sensors 34a and 80a can be of any standard type. In other embodiments, information from temperature sensors in various locations is utilized to determine information indicative of the temperature of SCR catalyst 88. Controller 42 may determine whether or not a temperature of the exhaust stream is within a desired SCR range and, in response, provide bypass command ByP to control bypass valve 57 and circulate exhaust gas through reduction injection system 86 via reductant heating portion 56 or bypass reductant injection system 86 via bypass 55. In other embodiment, bypass 55 and bypass valve 57 are eliminated and exhaust gas always passes through reductant injection system 80 when EGR flow is permitted by EGR valve 60. Controller 42 may also be connected to EGR valve 60 to provide EGR valve command EGR to control exhaust flow through EGR subsystem 50.

The reaction that converts a reductant solution to $NH_3$ when injected into the exhaust stream to effectively convert $NO_x$ over SCR catalyst 88 is temperature dependent. During injection, reductant solutions such as urea can impinge on the walls of the exhaust conduit, which can create localized cooling and formation of solid deposits on the exhaust tubing. Current control strategies attempt to mitigate these solid deposit formations by withholding reductant solution dosing until the exhaust system reaches a threshold operating temperature. According to the systems disclosed herein, using the exhaust gas through reductant heating portion 56 of EGR system 50 to superheat the reductant solution in reductant injection system 86 prior to release into exhaust conduit 34 allows the reductant solution to be converted to $NH_3$ under conditions that are independent of the temperature and flow of exhaust in exhaust conduit 34. Furthermore, as discussed in detail below, reductant injection system 86 may inject superheated reductant into a decomposition chamber prior to release into exhaust conduit 34, which allows the superheated reductant solution to at least partially decompose to minimize exhaust temperature requirements and improve distribution of the reductant in the aftertreatment system 80. Alternatively, the superheated and partially decomposed reductant solution may be injected directly into the exhaust stream.

Figure 2:
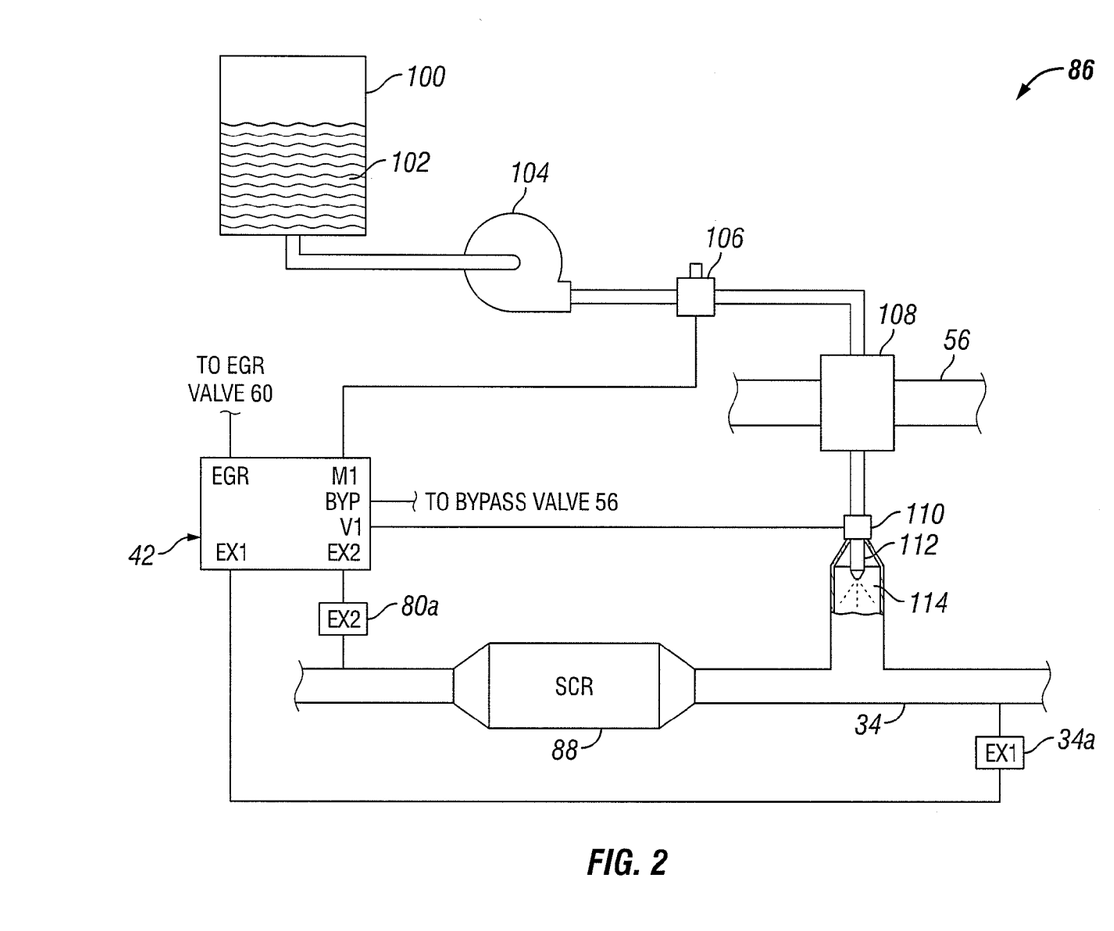
FIG. 2 is a schematic illustration of a portion of the aftertreatment system of FIG. 1.

Referring to FIG. 2, there is illustrated a schematic of reductant injection system 86. System 86 includes a reductant solution storage device 100 including a supply of reductant solution 102, such as aqueous urea. System 86 further includes a delivery pump 104 flow coupled to storage device 100 operable to pressurize the reductant solution, a metering device 106 flow coupled to delivery pump 104 to control the rate of delivery of the reductant solution 102, a heating device 108 flow coupled to metering device 106, and a valve-controlled injection nozzle 110 flow coupled to heating device 108. In another embodiment, reductant metering device 106 is located downstream of heating device 108 and is built into injection nozzle 110. Also illustrated in FIG. 2 is reductant heating portion 56 of EGR subsystem 50 fluidly coupled to heating device 108. The delivery pump 104 is operable to increase the pressure of the reductant solution 102 to a level sufficient to maintain the reductant solution 102 in a liquid state when the temperature of reductant solution 102 is raised above the temperature which would result in solution boiling at ambient environmental pressures.

The operation of system 86 begins with an amount of reductant solution 102 being drawn from storage device 100 and delivered by means of delivery pump 104 downstream through metering device 106, such as a metering valve, that regulates the flow rate of reductant solution through heating device 108. Alternatively, metering device 106 is located downstream from heating device 108. This delivery or pumping action increases the pressure of the reductant solution 102 to an amount substantially greater than atmospheric pressure as it enters the heating device 108. In the illustrated embodiment, heating device 108 is a gas to liquid heat exchanger that defines at least one flow passage for reductant solution 102 and at least one flow passage for exhaust gas from EGR subsystem 50 that functions to superheat (preheat) the reductant solution 102 to an elevated temperature of at least 100° Celsius. In one embodiment, reductant solution is superheated to a temperature between 100° and 230° Celsius.

The superheated and pressurized reductant solution expands through an orifice 112 of valve-controlled nozzle 110 into a decomposition chamber 114 that is connected to exhaust conduit 34 upstream of SCR catalyst 88. As the superheated and pressurized reductant solution expands through orifice 112, it flash vaporizes and the reductant solution decomposes. In the case of a urea reductant solution, the urea decomposes into $NH_3$ and HNCO. When the heated and pressurized reductant solution is injected into the lower pressure of the decomposition chamber upstream of the exhaust conduit 34, the at least partially decomposed reductant solution exists as a fine mist of reductant and steam in decomposition chamber 114 that is then released directly into the exhaust conduit 34. In another embodiment, decomposition chamber 114 is omitted and nozzle 110 releases at least partially decomposed reduction solution 102 from heating device 108 directly into exhaust conduit 34.

Figure 3:
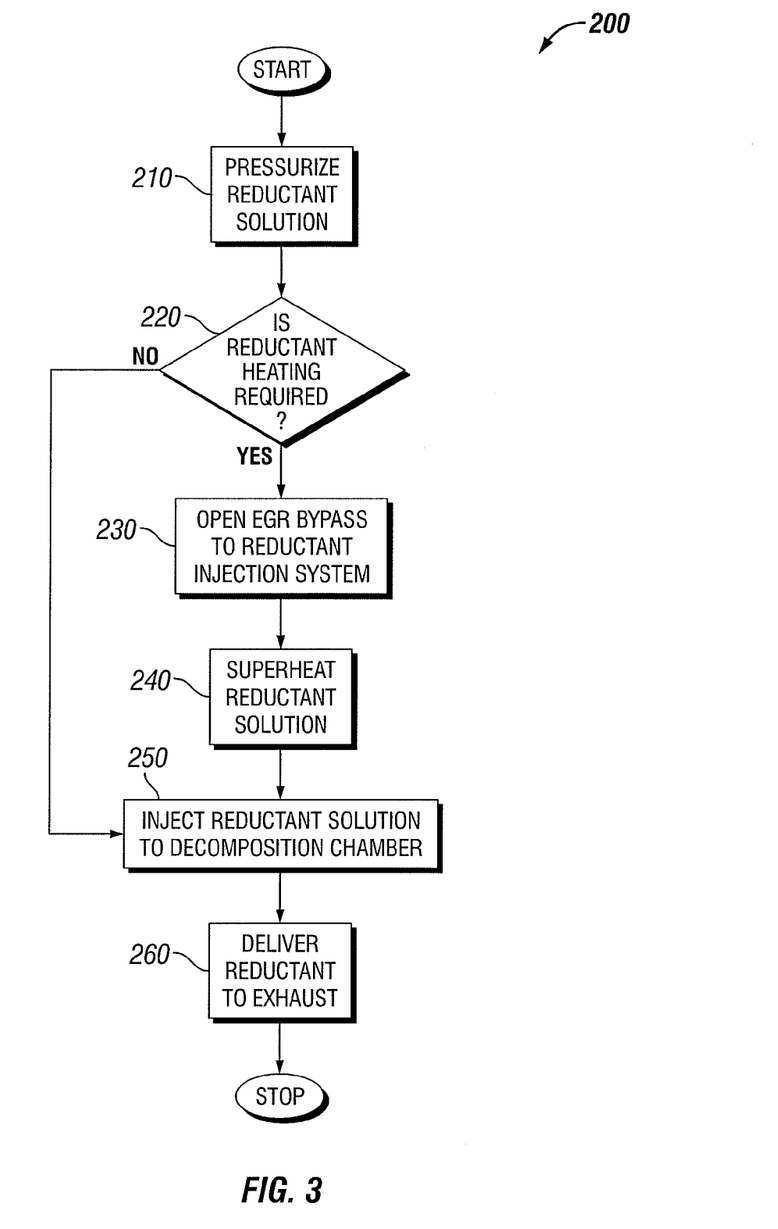
FIG. 3 is a flowchart corresponding to a procedure for delivering reductant in an aftertreatment system.

FIG. 3 illustrates an reductant injection control procedure 200 in flowchart form, which can be implemented with system 10 and reductant injection system 86 using appropriate operating logic executed by controller 42. Procedure 200 is directed to operating engine 12 with EGR to superheat reductant solution 102 when temperatures in exhaust conduit 34 are insufficient to decompose the reductant solution 102 upon injection into the exhaust stream. It should be understood, however, EGR subsystem 50 can be configured without bypass valve 57 and bypass 55 so that EGR flow is always circulated through reductant injection system 86 when EGR valve 60 is open.

As discussed above, operation of the SCR catalyst 88 is in part temperature dependent, so that temperature threshold may vary depending on the operating parameters of engine 12. The schematic flow diagram and related description which follows provides an illustrative embodiment of performing procedures for superheating reductant solution 102 to improve efficiency of the aftertreatment system 80 and reduce or eliminate formation of solid reductant deposits on the wall of the exhaust conduits. Operations illustrated are understood to be exemplary only, and operations may be combined or divided, and added or removed, as well as re-ordered in whole or part. Certain operations illustrated may be implemented by a computer executing a computer program product on a computer readable medium, where the computer program product comprises instructions causing the computer to execute one or more of the operations, or to issue commands to other devices to execute one or more of the operations.

Procedure 200 begins with operation 210 in which reductant solution 102 is pressurized by pump 104 when engine 12 is operating. Procedure 200 continues at conditional 220. Conditional 220 tests whether heating of the reductant solution 102 is required. For example, temperatures of aftertreatment system 80 indicated by temperature sensors 34a, 80a may indicate that operational temperatures exceed a threshold value such that heating of the reductant solution is not required. If the test of conditional 210 is negative (NO), then procedure 200 continues with operation 250 where bypass valve 57 is closed to direct EGR flow through bypass 55 and pressurized reductant is delivered to the decomposition chamber 114 for release into the exhaust conduit 34 without superheating from the EGR subsystem 50. In another embodiment, conditional 220 may include a determination that EGR valve 60 can be closed such that superheating of reductant with EGR subsystem 50 is not required.

If the test of conditional 220 is positive (YES), then procedure 200 continues at operation 230. At operation 230, EGR bypass valve 57 can be opened and EGR valve 60 can be opened, if necessary, to direct EGR flow through reductant heating portion 56 of EGR subsystem 50. At operation 240, the EGR flow passes through heating device 108 to superheat the pressurized reductant solution 102, which can be regulated by metering device 106 upstream of heating device 108 or downstream from heating device 108 at nozzle 110. Controller 42 is operable to control metering device 106 through connection M1. In one embodiment, the flow of reductant solution to heating device 108 can be regulated so that the temperature of reductant solution 102 is raised above a threshold temperature by the EGR flow, and the ability to raise the reductant solution temperature is dependent at least in part on the temperature of the EGR gas temperature through heating device 108. For example, at lower EGR gas temperatures, flow of reductant solution 102 to heating device 108 can be reduced to allow more time for heat transfer.

At operation 250, the pressurized, superheated and at least partially decomposed reductant solution 102 is injected through orifice 112 into decomposition chamber 114. In certain embodiments, controller 42 is connected to a control valve at nozzle 110 through connection V1. Controller 42 can be programmed to regulate the valve at nozzle 110, through a solenoid or other suitable actuator, to control the flow of reductant solution 102 to decomposition chamber 114 as required to treat the $NO_x$ level emissions in exhaust conduit 34 and/or in response to reductant amounts stored by SCR catalyst 88. At operation 260, reductant is released or delivered from the decomposition chamber 114 to exhaust conduit 34. In an alternate embodiment, superheated and pressurized reductant at least partially decomposes in heat exchanger 108 and is released from nozzle 110 for injection directly into the exhaust conduit 34. In another embodiment, the partially decomposed reductant solution is allowed to cool below superheated temperature prior to injection or release into the exhaust stream.

Many aspects of the present invention are envisioned. For example, one aspect is directed to a system comprising an internal combustion engine, an exhaust conduit fluidly coupled to the internal combustion engine, a selective catalytic reduction (SCR) catalyst fluidly coupled to the exhaust conduit, a storage device for storing a reductant solution, and a reductant solution delivery system defining a flowpath for delivering superheated reductant to the exhaust conduit at a location upstream of the SCR catalyst. The reductant solution delivery system includes a decomposition chamber connected to the exhaust conduit upstream of the SCR catalyst, an orifice along the flowpath opening into an inlet of the decomposition chamber, a heating device in the flowpath upstream of the orifice, and a metering device in the flowpath upstream of the heating device. The metering device regulates flow of pressurized reductant solution from the storage device to the heating device. The heating device is operable to superheat the pressurized reductant solution for passage through the orifice. The superheated pressurized reductant solution expands through the orifice and flash vaporizes to at least partially decompose in the decomposition chamber before entering the exhaust conduit.

In one embodiment, the system further includes a high pressure pump flow coupled to the reductant solution storage device. The high pressure pump is operable to pressurize the reductant solution from the storage device for delivery to the metering device. In another embodiment, the system includes a valve in the flowpath between the orifice and the heating device to regulate flow of pressurized superheated reductant solution through the orifice.

In a further embodiment, the system comprises an exhaust gas recirculation (EGR) subsystem connecting the exhaust conduit to an intake system of the internal combustion engine. In a refinement of this embodiment, the heating device includes a heat exchanger fluidly connected to the EGR subsystem and fluidly connected to the reductant solution flowpath between the orifice and the metering device. In yet a further refinement, the EGR subsystem includes a reductant heating portion connected to the heat exchanger, a bypass portion bypassing the heat exchanger, and a bypass valve operable to control flow of exhaust gas to the heat exchanger and to the bypass portion. In another refinement, the heat exchanger is operable to superheat the reductant solution to a temperature of at least 100° Celsius.

In one embodiment of the system, the reductant solution is a urea solution that at least partially decomposes in the heat exchanger to form $NH_4$ ions. In another embodiment, the reductant solution is a mixture of water and urea.

According to another aspect, an apparatus comprises a storage device for storing a urea solution, a pumping device fluidly connected to the urea solution in the urea solution storage device, a metering device fluidly connected to the pumping device to receive pressurized urea solution from the pumping device, and a heating device fluidly connected to the metering device. The heating device is operable to superheat a flow of pressurized urea solution that is regulated by the metering device. The apparatus also includes an orifice fluidly connected to the heating device that opens into a decomposition chamber. The superheated pressurized urea solution expands through the orifice and at least partially decomposes in the decomposition chamber. The decomposition chamber is connected to an exhaust conduit upstream of a selective catalytic reduction catalyst.

In one embodiment, the apparatus includes a valve in the flowpath between the orifice and the heating device to regulate flow of pressurized superheated urea solution through the orifice. In another embodiment, the heating device of the apparatus includes a heat exchanger fluidly connected to the metering device to receive urea solution therethrough. The heat exchanger is also connectable to an exhaust gas recirculation system to fluidly receive exhaust gas that supplies a heat source for superheating the pressurized urea solution. In one refinement of this embodiment, the heat exchanger is operable to superheat the urea solution to a temperature of at least 100° Celsius.

In another embodiment of the apparatus, the urea solution at least partially decomposes in the heat exchanger and/or the decomposition chamber to form $NH_4$ ions. In a further embodiment of the apparatus, the urea solution is a mixture of water and urea.

Another aspect includes a method comprising pressurizing a reductant solution from a reductant solution storage device, superheating the pressurized reductant solution, delivering the superheated reductant solution through an orifice, and expanding the superheated reductant solution in a decomposition chamber connected to the orifice to decompose the superheated reductant solution and form reductant in the decomposition chamber before releasing the reductant from the decomposition chamber into an exhaust system upstream from an SCR catalyst.

In one embodiment of the method, pressurizing the reductant solution includes pumping the reductant solution from the reductant solution storage device with a high pressure pump. In one refinement of this embodiment, the method includes metering a flow of the pressurized reductant solution from the pumping device before superheating the reductant solution. In another embodiment of the method, superheating the pressurized reductant solution includes passing the pressurized reductant solution through a heat exchanger connected to an exhaust gas recirculation system where the EGR system provides heat for superheating the reductant solution. In one refinement of this embodiment, the method includes opening an EGR valve and a bypass valve of the EGR system to direct exhaust gas to the heat exchanger. In another refinement of this embodiment, superheating the pressurized reductant solution includes raising a temperature of the pressurized reductant solution to at least 100° Celsius. In yet another embodiment, the method includes decomposing the superheated pressurized reductant solution in the heat exchanger and/or decomposition chamber to form $NH_4$ ions before releasing the reductant into the exhaust system.

In another aspect, a method includes pressurizing a reductant solution from a reductant solution storage device, superheating the pressurized reductant solution, such that a portion of the reductant solution decomposes in solution to form at least one of $NH_3$ gas and $NH_4+$ ions, delivering the partially decomposed reductant solution through a metering device, and expanding the partially decomposed reductant solution in an exhaust stream at a location upstream of a selective catalytic reduction (SCR) catalyst.

In one embodiment of the method, there is a decomposition chamber connected to the metering device and the method further includes decomposing the superheated reductant solution to form reductant in the decomposition chamber and releasing the reductant from the decomposition chamber into the exhaust stream upstream from the SCR catalyst. In another embodiment, the method further includes decomposing the superheated pressurized reductant solution in a decomposition chamber to form $NH_4$ ions before releasing the reductant into the exhaust system. In yet another embodiment of the method, the partially decomposed reductant solution is allowed to cool below superheated temperature prior to injection into the exhaust stream.

In another embodiment of the method, pressurizing the reductant solution includes pumping the reductant solution from the reductant solution storage device with a high pressure pump. In one refinement of this embodiment, the method includes metering a flow of the pressurized reductant solution from the pumping device before superheating the reductant solution.

In yet another embodiment of the method, superheating the pressurized reductant solution includes passing the pressurized reductant solution through a heat exchanger connected to an EGR system that provides heat for superheating the reductant solution. In one refinement of this embodiment, the method includes opening an EGR valve and a bypass valve of the EGR system to direct exhaust gas to the heat exchanger. In another refinement of this embodiment, superheating the pressurized reductant solution includes raising a temperature of the pressurized reductant solution to at least 100° Celsius.

According to another aspect, an apparatus includes a storage device for storing a urea solution, a pumping device fluidly connected to the urea solution in the storage device, and a heating device fluidly connected to the pumping device. The heating device is operable to superheat the flow of pressurized urea solution from the pumping device and at least partially decompose the reductant solution in solution to form at least one of $NH_3$ gas and $NH_4+$ ions. A metering device is fluidly connected to the heating device to receive at least partially decomposed urea solution from the heating device. An orifice fluidly connected to the metering device delivers at least partially decomposed urea solution into an exhaust system at a position upstream of a selective catalytic reduction (SCR) catalyst.

In one embodiment of this aspect, the apparatus includes a decomposition chamber connected to the orifice between the orifice and the exhaust system. The at least partially decomposed reductant solution is injected from the orifice into the decomposition chamber for further decomposition before release into the exhaust system. In another embodiment, the heating device of the apparatus is a heat exchanger that receives urea solution therethrough. The heat exchanger is configured for connection to an exhaust gas recirculation system to fluidly receive exhaust gas that that supplies a heat source for superheating the pressurized urea solution. In one refinement of this embodiment, the heat exchanger is operable to superheat the urea solution to a temperature of at least 100° Celsius. In yet another embodiment, the urea solution is a mixture of water and urea.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system comprising:
   an internal combustion engine;
   an exhaust conduit fluidly coupled to the internal combustion engine;
   a selective catalytic reduction (SCR) catalyst fluidly coupled to the exhaust conduit;
   a storage device for storing a reductant solution;
   a reductant solution delivery system defining a flowpath for delivering superheated reductant to the exhaust conduit at a location upstream of the SCR catalyst, wherein the reductant solution delivery system includes:
      a decomposition chamber connected to the exhaust conduit upstream of the SCR catalyst;
      an orifice along the flowpath opening into the decomposition chamber;
      a heating device in the flowpath upstream of the orifice; and
      a metering device in the flowpath upstream of the heating device, wherein the metering device regulates flow of pressurized reductant solution from the storage device to the heating device, wherein the heating device is operable to superheat the pressurized reductant solution for passage through the orifice, wherein the superheated pressurized reductant solution expands through the orifice and flash vaporizes to at least partially decompose in the decomposition chamber before entering the exhaust conduit.

2. The system of claim 1, further including a high pressure pump flow coupled to the storage device, wherein the high pressure pump is operable to pressurize the reductant solution from the storage device for delivery to the metering device.

3. The system of claim 1, further including a valve in the flowpath between the orifice and the heating device to regulate flow of pressurized superheated reductant solution through the orifice.

4. The system of claim 1, further comprising an exhaust gas recirculation (EGR) system connecting the exhaust conduit to an intake system of the internal combustion engine.

5. The system of claim 4, wherein the heating device includes a heat exchanger fluidly connected to the EGR system and fluidly connected to the reductant solution flowpath between the orifice and the metering device.

6. The system of claim 5, wherein the EGR system includes a reductant heating portion connected to the heat exchanger, a bypass portion bypassing the heat exchanger, and a bypass valve operable to control flow of exhaust gas to the heat exchanger and to the bypass portion.

7. The system of claim 5, wherein the heat exchanger is operable to superheat the reductant solution to a temperature of at least 100° Celsius.

8. The system of claim 1, wherein the reductant solution is a urea solution that at least partially dissolves in the decomposition chamber to form $NH_4$ ions.

9. The system of claim 1, wherein the reductant solution is a mixture of water and urea.

10. An apparatus comprising:
    a storage device for storing a urea solution;
    a pumping device fluidly connected to the urea solution in the storage device;
    a metering device fluidly connected to the pumping device;
    a heating device fluidly connected to the metering device, wherein the heating device is operable to superheat a flow of pressurized urea solution regulated by the metering device; and
    an orifice fluidly connected to the heating device that opens into a decomposition chamber, wherein the superheated pressurized urea solution expands through the orifice and at least partially decomposes in the decomposition chamber, wherein the decomposition chamber is connectable to an exhaust conduit upstream of a selective catalytic reduction catalyst.

11. The apparatus of claim 10, further including a valve in the flowpath between the orifice and the heating device to regulate flow of pressurized superheated urea solution through the orifice.

12. The apparatus system of claim 10, wherein the heating device includes a heat exchanger fluidly connected to the metering device to receive urea solution therethrough, the heat exchanger further being configured for connection to an exhaust gas recirculation system to fluidly receive exhaust gas that that supplies a heat source for superheating the pressurized urea solution.

13. The apparatus of claim 12, wherein the heat exchanger is operable to superheat the urea solution to a temperature of at least 100° Celsius.

14. The apparatus of claim 10, wherein the urea solution at least partially decomposes in the decomposition chamber to form $NH_4$ ions.

15. The apparatus of claim 10, wherein the urea solution is a mixture of water and urea.

16. A method, comprising:
    pressurizing a reductant solution from a reductant solution storage device;
    superheating the pressurized reductant solution;
    delivering the superheated reductant solution through an orifice; and
    expanding the superheated reductant solution in a decomposition chamber connected to the orifice to decompose the superheated reductant solution and form reductant in the decomposition chamber; and
    releasing the reductant from the decomposition chamber into an exhaust system upstream from a selective catalytic reduction catalyst.

17. The method of claim 16, wherein pressurizing the reductant solution includes pumping the reductant solution from the reductant solution storage device with a high pressure pump.

18. The method of claim 17, further comprising metering a flow of the pressurized reductant solution from the pumping device before superheating the reductant solution.

19. The method of claim 16, wherein superheating the pressurized reductant solution includes passing the pressurized reductant solution through a heat exchanger connected to an exhaust gas recirculation system, wherein the exhaust gas recirculation (EGR) system provides heat for superheating the reductant solution.

20. The method of claim 19, further comprising opening an EGR valve and a bypass valve of the EGR system to direct exhaust gas to the heat exchanger.

21. The method of claim 19, wherein superheating the pressurized reductant solution includes raising a temperature of the pressurized reductant solution to at least 100° Celsius.

22. The method of claim 16, further comprising decomposing the superheated pressurized reductant solution in the decomposition chamber to form $NH_4$ ions before releasing the reductant into the exhaust system.

23. A method, comprising:
    pressurizing a reductant solution from a reductant solution storage device;
    superheating the pressurized reductant solution, such that at least a portion of the reductant solution at least partially decomposes in solution to form at least one of NH3 gas and NH4+ ions;
    delivering the partially decomposed reductant solution through a metering device; and
    expanding the partially decomposed reductant solution in an exhaust stream at a location upstream of a selective catalytic reduction (SCR) catalyst.

24. The method of claim 23, wherein there is a decomposition chamber connected to the metering device and further comprising:
    decomposing the superheated reductant solution to form reductant in the decomposition chamber; and
    releasing the reductant from the decomposition chamber into the exhaust stream upstream from the SCR catalyst.

25. The method of claim 23, wherein pressurizing the reductant solution includes pumping the reductant solution from the reductant solution storage device with a high pressure pump.

26. The method of claim 25, further comprising metering a flow of the pressurized reductant solution from the pumping device before superheating the reductant solution.

27. The method of claim 23, wherein the partially decomposed reductant solution is allowed to cool below superheated temperature prior to injection into the exhaust stream.

28. The method of claim 23, wherein superheating the pressurized reductant solution includes passing the pressurized reductant solution through a heat exchanger connected to an exhaust gas recirculation (EGR) system, wherein the EGR system provides heat for superheating the reductant solution.

29. The method of claim 28, further comprising opening an EGR valve and a bypass valve of the EGR system to direct exhaust gas to the heat exchanger.

30. The method of claim 28, wherein superheating the pressurized reductant solution includes raising a temperature of the pressurized reductant solution to at least 100° Celsius.

31. The method of claim 23, further comprising decomposing the superheated pressurized reductant solution in a decomposition chamber to form $NH_4$ ions before releasing the reductant into the exhaust system.

32. An apparatus comprising:
    a storage device for storing a urea solution;
    a pumping device fluidly connected to the urea solution in the storage device;

a heating device fluidly connected to the pumping device, wherein the heating device is operable to superheat the flow of pressurized urea solution from the pumping device and at least partially decompose the reductant solution in solution to form at least one of $NH_3$ gas and $NH_4^+$ ions;

a metering device fluidly connected to the heating device to receive at least partially decomposed urea solution from the heating device; and an orifice fluidly connected to the metering device that opens into an exhaust system at a position upstream of a selective catalytic reduction (SCR) catalyst to release at least partially decomposed urea solution into the exhaust system.

33. The apparatus of claim 32, further comprising a decomposition chamber connected to the orifice between the orifice and the exhaust system, wherein at least partially decomposed reductant solution is injected from the orifice into the decomposition chamber for further decomposition before release into the exhaust system.

34. The apparatus of claim 32, wherein the heating device includes a heat exchanger to receive urea solution therethrough, the heat exchanger further being configured for connection to an exhaust gas recirculation system to fluidly receive exhaust gas that that supplies a heat source for superheating the pressurized urea solution.

35. The apparatus of claim 34, wherein the heat exchanger is operable to superheat the urea solution to a temperature of at least 100° Celsius.

36. The apparatus of claim 32, wherein the urea solution is a mixture of water and urea.

* * * * *